Aug. 13, 1929.      B. D. KUNKLE ET AL      1,724,095
REFRIGERATING APPARATUS
Filed Feb. 29, 1928
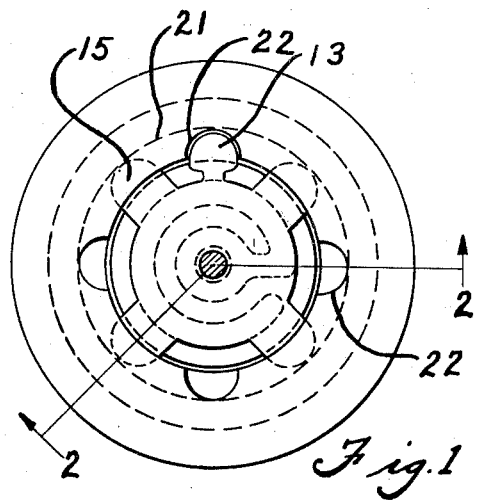
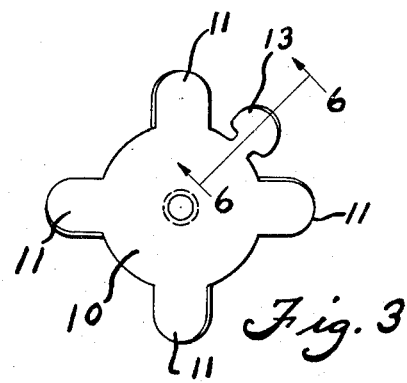
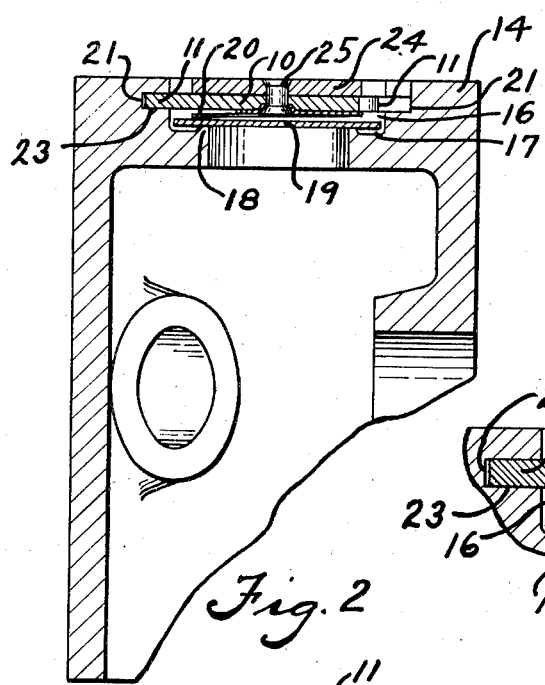
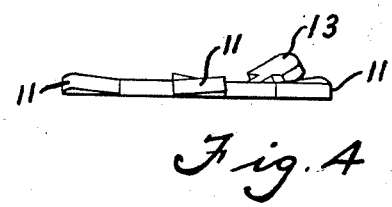
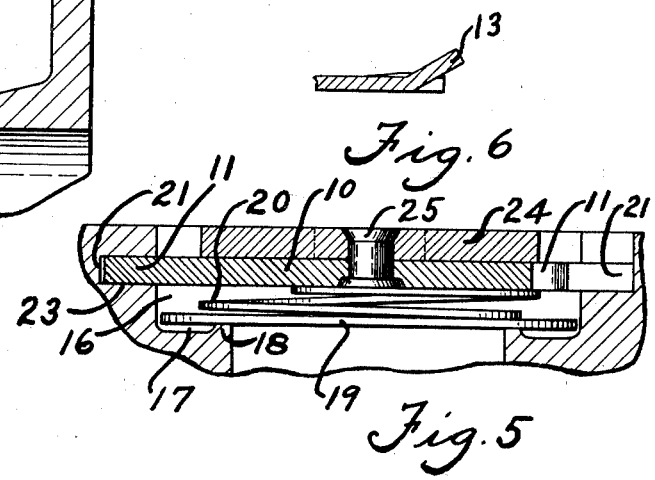
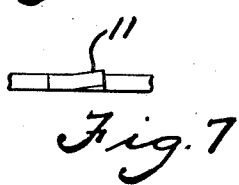
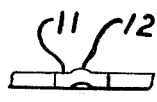
Inventors
Bayard D. Kunkle
Otto M. Summers
By Spencer, Hardman & Fehr
Attorneys Patented Aug. 13, 1929.

1,724,095

UNITED STATES PATENT OFFICE.

BAYARD D. KUNKLE AND OTTO M. SUMMERS, OF DAYTON, OHIO, ASSIGNORS TO FRIGIDAIRE CORPORATION, OF DAYTON, OHIO, A CORPORATION OF DELAWARE.

REFRIGERATING APPARATUS.

Application filed February 29, 1928. Serial No. 257,956.

This invention relates to new and useful improvements in displaceable disc check valves for compressors and the like.

It is an object of the invention to provide an improved valve structure which is readily assembled and dismantled and to provide improved means for mounting such valves in operative position in the compressor so that they will not work loose from the associated structure.

Further objects and advantages of the present invention will be apparent from the following description, reference being had to the accompanying drawing, wherein a preferred form of the present invention is clearly shown.

In carrying out the invention a valve structure is provided which in the embodiment chosen for illustrating the application of the invention is incorporated in the piston of a compressor or the like, and which includes a recess in the piston head, a disc valve therein cooperating with a seat and a novel form of valve retainer carrying lugs on its periphery adapted to fit into recesses provided in the piston structure for locking said valve disc in place after it has been positioned.

In the drawings:

Fig. 1 shows a top view of the piston of a compressor used in mechanical refrigerators and provided with the improved valve structure;

Fig. 2 is a section through the piston taken on the line 2—2 of Fig. 1, showing the valve in section;

Fig. 3 is a top view of the valve retaining element;

Fig. 4 shows a side view of the retaining element;

Fig. 5 is an enlarged view of the piston and valve structure;

Fig. 6 is a cut on the line 6—6 of Fig. 3; and

Figs. 7 and 8 illustrate modified means for preventing shifting of the valve.

In the construction of valves for compressors, particularly the type used in mechanical refrigerators, it is desirable to have as simple a structure as possible which can be readily assembled, dismantled and reassembled both in the factory and by the service man in the field, and which is reliable and quiet in operation. By means of the present invention, a valve structure is provided which is readily inserted in position in the piston of a compressor and which has means provided for preventing loosening thereof during operation of the compressor.

Referring in detail to the drawings the improved valve structure is shown applied to the piston of a compressor used in refrigerating apparatus. The piston comprises a body 14 provided with a recessed portion 16 which is undercut as at 17 to provide an annular ridge portion 18 serving as a seat for a valve 19 of the disc type. A spring 20 serves to keep the valve seated. The recess 16 is further undercut sidewise into the piston body as at 21 to accommodate a valve retaining plate of irregular contour. One form of retaining plate may be a spider or washer shown in detail in Fig. 3. This spider is provided with equidistantly spaced lugs 11 radiating from its sides as shown and thereby provides an irregularly shaped retaining plate. An irregular opening leads to the recess 21. This irregularly shaped opening may be of a form to accommodate irregularities of the plate so that it can be inserted into the recess 21. In the present embodiment wherein a spider 10 is used having lugs 11, cuts 22 (Fig. 1) are provided in the overhanging wall just above the portion 23 of the recess to permit the positioning of the spider into said recess.

When the valve structure is assembled the valve disc is first placed in position so as to rest upon the valve-seat 18 whereupon the retaining spider shown in Fig. 3 is slipped into the recess 21 just above the valve by positioning the spider so that the lugs 11 drop into the holes 22 and then turning the spider to make these lugs occupy the position shown by the dotted lines in Fig. 1. Likewise formed out of the body of the spider is a lug 13 having a spade-shaped head and a relatively narrower neck portion. The shape of lug 13 corresponds substantially to the shape of the lugs 11 so that it will likewise fit into the same openings 22, but as indicated in Fig. 3 and clearly shown in Fig. 4 it is bent up at an angle to the body of the spider and is located intermediate two of the lugs 11. In positioning the spider it is obvious that by slipping the same into the recessed portion of the piston so that the lugs 11 fall into the holes 22 and by rotating the spider these lugs will be caused to assume the position shown by the dotted lines e. g. 15, in Fig. 1. At the same time the upstanding lug 13 will come in juxtaposition with one of the holes 22. By bending the lug 13 partly downwardly so as to make it lie within the walls of the hole 22 the lug will serve as a lock for preventing the rotation of the spider and its accidental withdrawal.

The lugs 11 are preferably given a slight twist as shown in Fig. 4. This twist may be a gradual one. The purpose of this twist is to impart a degree of resiliency to the lugs so as to cause the lugs to engage the opposed walls of the recess so as to make a snug fit with the walls of the groove by dragging therein and thus prevent chattering and vibration of the spider during operation with its ensuing noise. If desired the lugs may be formed as shown in Fig. 7 where the bent-up portion of the lug 11 begins in the center of the body of the lug, or else the form shown in Fig. 8 may be used wherein a ridge or bump 12 is pressed out of the lug body for the same purpose. A key or hand wrench (not shown) having ears adapted to engage the lugs 11 may be used for rotating the spider into locked position in the piston, or, the lug 13 may be used as the means through which the spider is rotated.

While the spider may be used alone for locking the valve in place, in the preferred embodiment of the invention a washer 24 is placed upon the same so as to produce a more solid structure having greater inertia and less tendency to vibrate and to produce a substantially smooth unbroken top surface on the piston so as to decrease the compression space above the piston. The washer 24 and spider 10 are united by means of a rivet 25 which also holds the spring 20 so that the three elements are removable as a unit. This spring is preferably of the convolute type and is carried by the valve retainer structure as shown so that the lower portion of the spring bears against the valve in such a manner as to cause it to operate with a tilting instead of an up and down action. This is effected by so arranging the spring that its resultant of force acts on the valve in a line passing outside the center of pressure on the valve.

When it is desired to dismantle the structure so as to remove the valve, the auxiliary locking lug or ear 13 is bent up to its original position by means of a suitable tool so as to clear the walls of the slot in which it is confined after which the spider 10 may be rotated to the position in which the lugs 11 are able to slip through the slots 22. If desired more than one locking lug 13 may be used.

A readily assembled and dismantled valve structure is thus produced which is free from vibration and substantially noiseless in operation.

While the form of embodiment of the invention as herein disclosed, constitutes a preferred form, it is to be understood that other forms might be adopted, all coming within the scope of the claims which follow.

What is claimed is as follows:

1. A check valve structure for compressors comprising in combination with a port and a valve seat surrounding said port, of a floating disk valve adapted to coact with said seat, and means for locking said valve in place including a recessed portion above said valve, a plate within said recess, said recess having one or more slots and said plate having one or more lugs fitting into said slots and being rotatable in said recess to bring said lugs out of juxtaposition with said slots.

2. A check valve structure for compressors comprising in combination with a port and a valve seat surrounding said port, of a floating disk valve adapted to coact with said seat, and means for locking said valve in place including a recessed portion above said valve, a plate within said recess, said recess having one or more slots and said plate having one or more lugs fitting into said slots and being rotatable in said recess to bring said lugs out of juxtaposition with said slots said lugs having bent-up portions adapted to engage the opposed walls of said recess.

3. A check valve structure for compressors comprising in combination with a port, and a valve seat surrounding said port, of a floating disk valve adapted to coact with said seat, and means for locking said valve in place including a recessed portion above said valve, a plate within said recess, said recess having one or more slots and said plate having one or more lugs fitting into said slots and being rotatable in said recess to bring said lugs out of juxtaposition with said slots said lugs having bent-up portions adapted to engage the opposed walls of said recess and an auxiliary locking lug adapted to register with and engage the walls of a slot when said plate is in valve retaining position.

4. A check valve structure for compressors comprising in combination with a port and a valve seat surrounding said port, of a floating disk valve adapted to coact with said seat and means for locking said valve in place including a recessed portion above said valve, a plate within said recess, said recess having one or more slots and said plate having one or more lugs fitting into said slot and being rotatable in said recess to bring said lugs out of juxtaposition with said slots and spring means carried by said locking means and yieldingly engaging said valve so that the resultant of force of said spring acts upon said valve in a line passing outside the center of pressure on said valve.

5. A check valve structure for compressors comprising in combination with a port and a valve seat surrounding said port, of a floating disc valve adapted to coact with said seat, and means for locking said valve in place including a recessed portion, a plate within said recess, said recess having an irregular opening and said plate having an irregular contour and insertable through said opening and rotatable in said recess to bring the irregular portion of the plate and opening out of juxtaposition.

6. A check valve structure for compressors comprising in combination with a port and a valve seat surrounding said port, of a floating disc valve adapted to coact with said seat, and means for locking said valve in place including a recessed portion, a plate within said recess, said recess having an irregular opening and said plate having an irregular contour and insertable through said opening and rotatable in said recess to bring the irregular portion of the plate and opening out of juxtaposition, the irregular portion of the plate being formed to frictionally engage the walls of said recess.

In testimony whereof we hereto affix our signatures.

BAYARD D. KUNKLE.
OTTO M. SUMMERS.